(12) United States Patent
Ambrose et al.

(10) Patent No.: US 6,479,611 B2
(45) Date of Patent: Nov. 12, 2002

(54) AMINOPLAST-BASED CROSSLINKERS AND POWDER COATING COMPOSITIONS CONTAINING SUCH CROSSLINKERS

(75) Inventors: Ronald R. Ambrose, Pittsburgh, PA (US); Anthony M. Chasser, Allison Park, PA (US); Shengkui Hu, Glenshaw, PA (US); John R. Schneider, Glenshaw, PA (US); Jackie L. Smith, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/058,928

(22) Filed: Jan. 28, 2002

(65) Prior Publication Data

US 2002/0103293 A1 Aug. 1, 2002

Related U.S. Application Data

(62) Division of application No. 09/666,265, filed on Sep. 21, 2000.

(51) Int. Cl.$^7$ .............................................. C08G 18/10
(52) U.S. Cl. .......................... 528/62; 528/59; 524/904; 525/375; 525/934
(58) Field of Search ...................... 528/62, 59; 524/904; 525/375, 934

(56) References Cited

U.S. PATENT DOCUMENTS

| | | | |
|---|---|---|---|
| 3,759,854 A | 9/1973 | Chang et al. | 260/21 |
| 3,904,623 A | 9/1975 | Shay et al. | 260/249.6 |
| 3,980,732 A | 9/1976 | Isaksen et al. | 260/850 |
| 4,066,591 A | 1/1978 | Scriven et al. | 260/29.2 TN |
| 4,185,045 A | 1/1980 | Yoshihara et al. | 525/181 |
| 4,189,421 A | 2/1980 | Shay et al. | 260/38 |
| 4,217,377 A | 8/1980 | Shay et al. | 427/195 |
| 4,230,829 A | 10/1980 | Yoshihara et al. | 525/162 |
| 4,393,181 A | 7/1983 | Allen | 525/504 |
| 5,302,462 A | 4/1994 | Shah et al. | 428/482 |
| 5,565,131 A | 10/1996 | Blank | 525/456 |
| 6,087,464 A | 7/2000 | Swarup et al. | 528/73 |

*Primary Examiner*—Tae H. Yoon
(74) *Attorney, Agent, or Firm*—Diane R. Meyers; Deborah M. Altman

(57) ABSTRACT

Two types of aminotriazine-based crosslinking agents are provided. Crosslinking agent I includes the ungelled reaction product of (A) a reactive urethane group-containing reaction product and (B) an aminotriazine compound having one or less non-alkylated NH bond per triazine ring. The reactive urethane group-containing reaction product (A) is the reaction product of (1) a polyester polyol, and (2) a mono-isocyanate. The crosslinking agent I is essentially free of urethane NH functionality and has a glass transition temperature of at least 25° C. Crosslinking agent II includes the ungelled reaction product of (A) a reactive urethane group-containing reaction product and (B) an aminotriazine compound having one or less non-alkylated NH bond per triazine ring. The reactive urethane group-containing reaction product (A) is the reaction product of (1) a polyisocyanate and (2) a monohydric capping agent. The crosslinking agent II is essentially free of urethane N—H functionality and has a glass transition temperature of at least 10° C. Methods for preparing crosslinking agents I and II are also provided. Further provided is a curable composition of a film-forming polymer having reactive functional groups and the previously described crosslinking agent II. Also provided are powder coating compositions which each include a solid particulate mixture of a reactive group-containing polymer having a $T_g$ of at least 30° C. and the previously described crosslinking agents I or II. Multilayer composite coating compositions and coated substrates are also provided.

40 Claims, No Drawings

AMINOPLAST-BASED CROSSLINKERS AND POWDER COATING COMPOSITIONS CONTAINING SUCH CROSSLINKERS

CROSS REFERENCE TO RELATED PATENT APPLICATIONS

This patent application is a divisional of U.S. patent application Ser. No. 09/666,265, filed Sep. 21, 2000.

FIELD OF THE INVENTION

The present invention relates to a crosslinking agent prepared from a urethane group-containing adduct and an aminotriazine compound and to powder coating compositions containing such a crosslinking agent.

BACKGROUND OF THE INVENTION

In recent years, powder coatings have become increasingly popular because these coatings are inherently low in volatile organic content ("VOC"), which significantly reduces emissions of volatile organic compounds into the atmosphere during application and curing processes.

Hydroxyl, carboxyl, carbamate and/or epoxy functional resins, such as acrylic and polyester resins having relatively high glass transition temperatures ("Tg"), are commonly used as main film-forming polymers for these coatings. Because acrylic polymer systems can be more heat-resistant than condensation polymers, they can provide powder coating compositions having improved storage stability. However when exposed to the extreme temperatures which can be encountered during shipping and/or storage in many geographic areas, even better powder coating stability is desired.

Aminoplast resins are well known in the art as low cost crosslinking agents for hydroxyl, carboxyl and/or carbamate functional polymers in conventional liquid coating compositions. Common aminoplast resins are based on condensation products of formaldehyde with an amino- or amidogroup carrying substance. Examples of these aminoplast resins include the methylol and alkoxymethyl derivatives of ureas, melamines and benzoguanamines which are most commonly used in liquid coating compositions. Such aminoplast resins provide enhanced coating properties such as exterior durability, chemical resistance and mar resistance.

Attempts to produce powder coating compositions based on conventional aminoplast resins which exhibit these desirable properties have been largely unsatisfactory because these materials are typically in liquid form and, as such, cause poor powder stability.

The methoxylated aldehyde condensates of glycoluril, which are solid products, are the aminoplast resins most commonly employed as crosslinking agents in powder coating compositions. Although solid in form, these materials nonetheless can depress the Tg of the powder coating composition significantly, even when combined with high Tg film-forming polymers such as the acrylic polymers described above. Such a depression in Tg also can result in poor powder stability.

Moreover, the use of conventional aminoplast resins in powder coating compositions can result in the phenomenon commonly referred to as "gassing". "Gassing" occurs as a result of vaporization of the alcohol generated in the thermally induced aminoplast crosslinking reaction. The alcohol vapor is driven off through the coating film upon heating and, as the viscosity of the coating increases during the curing process, pinholes or craters are formed as the gas escapes through coating surface.

Carbamate functional polymers, that is, polymers having reactive pendent and/or terminal carbamate functional groups, are well known in the art as suitable film-forming resins for liquid coating systems where, for example, when combined with an aminotriazine curing agent, they provide coatings having excellent acid etch resistance. The carbamate N—H groups react readily with the methoxyl groups of the aminotriazine curing agent, thereby forming a urethane linkage which provides this acid etch resistance. These carbamate functional polymers further provide coatings which have excellent durability and adhesion properties.

Copending U.S. patent application Ser. No. 09/538,836 discloses powder coating compositions comprising a solid particulate mixture of a carbamate functional polymer, for example an acrylic, polyester and/or polyurethane polymer, in conjunction with a glycoluril resin. Due to the high glass transition temperature of the carbamate functional polymer, the powder coating compositions provide improved storage stability as well as coatings having excellent acid etch resistance. However, as discussed above, in some powder coating systems, the glycoluril crosslinking agent can depress the $T_g$ sufficiently to adversely affect powder stability.

It would, therefore, be advantageous to provide an aminotriazine-based crosslinking agent suitable for use in a powder coating composition which gives a highly stable powder as well as an acid etch resistant coating free of pinholes or crater resulting from "gassing" during the curing process.

SUMMARY OF THE INVENTION

In accordance with the present invention, two types of aminotriazine-based crosslinking agents are provided. The first type of crosslinking agent ("crosslinking agent I") comprises the ungelled reaction product of (A) a reactive urethane group-containing reaction product and (B) an aminotriazine compound having one or less non-alkylated NH bond per triazine ring. The reactive urethane group-containing reaction product (A) comprises the reaction product of (1) a polyester polyol, and (2) a mono-isocyanate. The crosslinking agent is essentially free of urethane NH functionality and has a glass transition temperature of at least 25° C.

The present invention also provides a method for preparing the crosslinking agent I described above. The method comprises the steps of (1) reacting (a) a polyester polyol, and (b) a mono-isocyanate in a molar ratio of reactant (a) to reactant (b) ranging from 1:1.8 to 2.0 to form a urethane group-containing reaction product; (2) combining the reaction product of step (1) with an aminotriazine compound having one or less non-alkylated NH bond per triazine ring in a molar ratio of urethane group-containing reaction product to aminotriazine compound ranging from 1:1.5 to 3.2 to form a reaction admixture; and (3) heating the reaction admixture of step (2) to a temperature ranging from 95° C. to 135° C. for a time sufficient to form a powder crosslinking agent having a glass transition temperature of at least 25° C. which is essentially free of urethane NH functionality as determined by infrared spectroscopy.

Further provided is a powder coating composition comprising a solid particulate mixture of a reactive group-containing polymer having a $T_g$ of at least 30° C., and the crosslinking agent I described immediately above.

The second type of crosslinking agent ("crosslinking agent II") comprises the ungelled reaction product of (A) a reactive urethane group-containing reaction product and (B)

an aminotriazine compound having one or less non-alkylated NH bond per triazine ring. The reactive urethane group-containing reaction product (A) comprises the reaction product of (1) a polyisocyanate and (2) a monohydric capping agent. The crosslinking agent is essentially free of urethane N—H functionality and has a glass transition temperature of at least 10° C.

The present invention also provides a method for preparing the crosslinking agent II. The method comprises the steps of (1) reacting the following reactants: (a) a polyisocyanate, and (b) a monohydric capping agent, wherein the ratio of NCO equivalents of reactant (1) to OH equivalents of reactant (2) ranges from 0.8 to 1.0:1, to form a urethane group-containing reaction product; (2) combining the reaction product of step (1) with an aminotriazine compound having one or less non-alkylated NH bond per triazine ring in a molar ratio of urethane group-containing reaction product to aminotriazine compound ranging from 1.0:2.0 to 4.0 to form a reaction admixture; and (3) heating the reaction admixture of step (2) to a temperature ranging from 95° C. to 135° C. for a time sufficient to form a powder crosslinking agent having a glass transition temperature of at least 10° C. which is essentially free of urethane NH functionality as determined by infrared spectroscopy.

Further provided is a curable composition comprising a film-forming polymer having reactive functional groups and the crosslinking agent II described immediately above. Also provided is a curable powder coating composition comprising a solid particulate mixture of a reactive group-containing polymer having a $T_g$ of at least 30° C. and the crosslinking agent II described immediately above.

The present invention additionally provides multilayer composite coating compositions comprising a basecoat deposited from a basecoat film-forming composition and a topcoat over at least a portion of the basecoat, the topcoat deposited from a powder topcoating composition comprising a solid particulate film-forming mixture of (A) a polymer containing reactive functional groups, said polymer having a glass transition temperature of at least 30° C. and (B) crosslinking agent I or II.

Coated substrates are also provided.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As mentioned above, the present invention provides two types of aminotriazine-based crosslinking agents, crosslinking agent I and crosslinking agent II. Both types of crosslinking agent are based on the reaction of urethane N—H groups with aminotriazine methoxyl groups.

The reactive urethane group-containing reaction products used in the preparation of the crosslinking agents of the present invention contain urethane groups of the following structure (I):

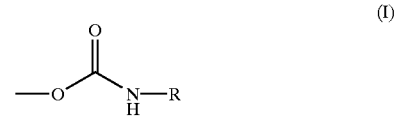

Each urethane N—H group can react with a methoxyl group of the aminotriazine compound and the resulting reaction product is an ungelled, solid material.

By contrast, when, for example, when a multifunctional carbamate material is reacted under similar conditions with an aminotriazine compound, the resulting reaction product typically is a gelled material.

The carbamate functional group can be represented by the following structure (II):

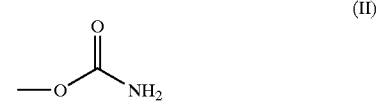

The above-mentioned gelation is presumably due to reaction of both hydrogens of one carbamate $NH_2$ group with the aminotriazine methoxyl groups.

As used herein, by "ungelled" is meant that the reaction product can be dissolved in a suitable solvent or resin and has an intrinsic viscosity when so dissolved. The intrinsic viscosity of the reaction product is an indication of its molecular weight. A gelled reaction product, on the other hand, since it is of essentially infinitely high molecular weight, will have an intrinsic viscosity too high to measure. Moreover, the reaction product can be melted, solidified and remelted.

Crosslinking Agent I

The first type of crosslinking agent ("crosslinking agent I") comprises the ungelled reaction product of (A) a reactive urethane group-containing reaction product and (B) an aminotriazine compound having one or less non-alkylated NH bond per triazine ring.

The reactive urethane group-containing reaction product (A) comprises the reaction product of (a) a polyester polyol, and (b) a mono-isocyanate. The polyester polyol (a) can be any of a variety of polyesters having two or more reactive hydroxyl groups. Preferably, the polyester polyol (a) comprises the condensation reaction product of (a) a cycloaliphatic polyol and (b) a cyclic polycarboxylic acid or anhydride.

The cycloaliphatic polyol (a) can be any of a variety of polyhydric cycloaliphatic compounds well known in the art. Suitable examples of cycloaliphatic polyols include those selected from the group consisting of hydrogenated Bisphenol A, hydrogenated Bisphenol F, hydrogenated Bisphenol E, M, P, Z, etc. and the like, cyclohexyl dimethanol, cyclohexane diol and mixtures thereof. Hydrogenated Bisphenol A is preferred.

The cyclic polycarboxylic acid or anhydride (b) can be any cyclic compound having two or more carboxylic acid/anhydride groups per molecule, Preferably, the cyclic polycarboxylic acid/anhydride (b) is selected from the group consisting of hexahydrophthalic acid phthalic acid, isophthalic acid, terephthalic acid, anhydrides thereof, and mixtures thereof. Hexahydrophthalic anhydride is preferred.

The polyester polyol (1) can be prepared by general condensation reaction techniques well-known in the art so long as the ratio of reactants (a) and (b) and reaction conditions are such that the resulting condensation reaction product comprises two or more reactive hydroxyl groups per molecule. For purposes of the present invention, with regard to crosslinking agent I, the molar ratio of the cycloaliphatic polyol (a) to the cyclic polycarboxylic acid or anhydride (b) typically ranges from 1.5 to 2.5:1, preferably from 1.7 to 2.3:1, and more preferably from 1.8 to 2.2:1.

The polyester polyol (1) typically has a number average molecular weight (Mn) ranging from 300 to 3000, preferably from 350 to 2500, and more preferably from 400 to 2200. Unless stated otherwise, as used in the specification and the claims, molecular weights are number average molecular weights for polymeric materials indicated as "Mn" and obtained by gel permeation chromatography using a polystyrene standard in an art-recognized manner.

Also, the hydroxyl value of the polyester polyol (1) typically is greater than 90, and preferably ranges from 100 to 180, and more preferably from 110to 170.

Further, the polyester polyol (1) typically has a glass transition temperature of at least 30° C., preferably at least 35° C., and more preferably at least 40° C. The $T_g$ of the polyester polyol can be calculated or it can be measured experimentally using differential scanning calorimetry (rate of heating 10° C. per minute, $T_g$ taken at the first inflection point). Unless otherwise indicated, the stated $T_g$ as used herein refers to the measured $T_g$.

As aforementioned, the reactive urethane group-containing reaction product (A) comprises the reaction product of a polyester polyol (1) which is described in detail immediately above, and a mono-isocyanate (2). The mono-isocyanate (2) can be any of a variety of isocyanate compounds which are monofunctional with regard to the NCO group. Non-limiting examples of suitable mono-isocyanates include those selected from cyclohexyl isocyanate, phenyl isocyanate, butyl isocyanate and mixtures thereof, with cyclohexyl and phenyl isocyanates being preferred.

With reference to the crosslinking agent I of the present invention, the reactive urethane group-containing reaction product (A) can be prepared by general NCO/OH reaction techniques well-known in the art, so long as the ratio of reactants (1) and (2) and reaction conditions are such that the resulting reaction product comprises at least one, preferably at least two, reactive urethane NH groups per molecule. For purposes of the present invention, with regard to the crosslinking agent 1, the molar ratio of the polyester polyol (1) to the mono-isocyanate (2) typically ranges from 1:1.7 to 2.0, preferably from 1:1.75 to 2.0, and more preferably from 1:1.8 to 2.0.

The reactive urethane group containing reaction product (A) is prepared generally as follows. Typically, the polyester polyol is dissolved in an appropriate aromatic solvent, for example xylene or toluene, with a tin compound, for example dibutyl tin dilaurate and dibutyl tin diacetate, as a catalyst. The mixture is then preheated to approximately 55° C. and the mono-isocyanate is added dropwise. The addition rate typically is adjusted so that the reaction temperature is less than 90° C. The reaction is complete when all the isocyanate functionality is consumed.

As discussed above, crosslinking agent I of the present invention comprises the ungelled reaction product of the reactive urethane group containing reaction product (A) described in detail above, and an aminotriazine compound (B) which has one or less non-alkylated NH bond per triazine ring.

The aminotriazine compounds having one or less non-alkylated NH bond per triazine ring which are useful as component (B) in the preparation of crosslinking agent I (and II as discussed below) of the present invention include aminoplast resins such as the alkoxy alkyl aminotriazine compounds derived from melamine, benzoguanimine, acetoguanamine, formoguanamine, spiroguanamine and the like. In a preferred embodiment of the present invention, the aminotriazine compound comprises (methoxymethyl) melamine.

Aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris (ethylamino)-1,3,5 triazine.

While the aldehyde employed is most often formaldehyde, other similar condensation products can be made from other aldehydes, such as acetaldehyde, crotonaldehyde, acrolein, benzaldehyde, furfural and glyoxal.

The aminoplast resins preferably contain methylol or other alkylol groups, and in most instances, at least a portion of these alkylol groups are etherified by a reaction with an alcohol. Any monohydric alcohol can be employed for this purpose, including such alcohols as methanol, ethanol, propanol, butanol, pentanol, hexanol, heptanol and others, as well as, benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol.

Preferred aminoplast resins for use as the aminotriazine compound (B) in the preparation of crosslinking agent I of the present invention are the highly alkylated, low imino aminoplast resins which have a degree of polymerization ("DP") of less than 1.5. Generally, the number average degree of polymerization is defined as the average number of structural units per polymer chain (see George Odian, *Principles of Polymerization,* John Wiley & Sons (1991)). For purposes of the present invention, a DP of 1.0 would indicate a complete monomeric triazine structure, while a DP of 2.0 indicates two triazine rings joined by a methylene or methylene-oxy bridge. It should be understood that the DP values reported herein and in the claims represent average DP values as determined by gel permeation chromatography.

Preferred aminotriazine compounds include modified melamine-formaldehyde resin, for example RESIMENE® CE-7103 commercially available from Solutia, Inc. and CYMEL® 300; ethylated-methylated benzoguanimine-formaldehyde resin, for example CYMEL® 1123; and methylated-butylated melamine-formaldehyde resin, for example CYMEL® 1135, all of which are commercially available from Cytec Industries, Inc.

In the preparation of crosslinking agent I of the present invention, the reactive urethane group-containing reaction product (A) and the aminotriazine compound (B) are combined in a molar ratio such that the aminotriazine compound (B) is in excess. This results in a stable crosslinking agent which is essentially free of urethane NH functionality. The reaction is monitored via infrared spectroscopy for the disappearance of urethane N—H functionality relative to an internal standard (i.e., the signal of a structure which will remain unchanged during the reaction, for example, the urethane carbonyl signal).

Typically, in the preparation of crosslinking agent I of the present invention, the molar ratio of the urethane group-containing reaction product (A) to the aminotriazine compound (B) ranges from 1:1.5 to 5.0, preferably to 1:1.5 to 4.0, and more preferably from 1:1.5 to 3.2. With regard to the aminotriazine compound (B), it should be understood that the theoretical monomeric molecular weight of the aminotriazine compound (that is, DP=1) is used to calculate the above-referenced "molar ratio".

The crosslinking agent I of the present invention is prepared generally by reacting an alkoxylated aminotriazine compound with the urethane-containing material (A) in a suitable aromatic solvent, for example, xylene and toluene, together with an appropriate strong acid catalyst. Non-limiting examples of suitable strong acid catalysts include dodecyl benzene sulfonic acid and para-toluene sulfonic acid. Normal condensation techniques as are well-known to the art can be used. The reaction is typically carried out at a temperature ranging from 90° C. to 135° C. and terminated when the end point is detected by infrared spectroscopy.

Crosslinking agent I of the present invention typically has a glass transition temperature of at least 25° C., preferably at least 30° C., more preferably at least 35° C., and even more preferably at least 40° C. Also, the crosslinking agent I typically has a glass transition temperature less than 150° C., preferably less than 120° C., more preferably less than 100° C., and even more preferably less than 80° C. The glass transition temperature of the crosslinking agent I can range between any combination of these values, inclusive of the recited values.

Crosslinking Agent II

As discussed above, the present invention also relates to a second type of aminotriazine-based crosslinking agent (that is, crosslinking agent II) which comprises the ungelled reaction product of a reactive urethane group-containing reaction product (A) and an aminotriazine compound (B) having one or less non-alkylated NH bond per triazine ring. The crosslinking agent II is essentially free of urethane NH functionality and has a glass transition temperature of at least 10° C.

The reactive urethane group-containing reaction product (A) comprises the reaction product of (1) a polyisocyanate and (2) a monohydric capping agent. Non-limiting examples of polyisocyanates suitable for use as reactant (1) include aliphatic polyisocyanates, particularly aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and α,α-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Higher polyisocyanates, for example isophorone diisocyanate trimer and hexamethylene diisocyanate trimer are also useful and, typically, are preferred. Mixtures of polyisocyanates can also be used.

The monohydric capping agent (2) can comprise any of a wide variety of mono-hydroxyl functional materials. Typically, the monohydric capping agent (2) comprises lower aliphatic alcohols, for example cyclic and acyclic alcohols having 1 to 6 carbon atoms in the alkyl group and/or aromatic alcohols. Non-limiting examples include methanol, ethanol, propanol, butanol, hexanol, cyclohexanol and phenol. The preferred monohydric capping agent is selected methanol, cyclohexanol, phenol and mixtures thereof. Cyclohexanol is preferred.

With reference to the crosslinking agent II of the present invention, the reactive urethane group-containing reaction product (A) can be prepared by general NCO—OH reaction techniques well-known in the art, so long as the ratio of reactants (1) and (2) and reaction conditions are such that the resulting reaction product comprises at least one, preferably at least two, reactive urethane NH groups per molecule. For purposes of the present invention, with regard to the crosslinking agent II the ratio of NCO equivalents of the polyisocyanate (1) to OH equivalents of the monohydric capping agent (2) ranges from 0.70 to 1.0:1, preferably from 0.75 to 1.0:1, and more preferably from 0.8 to 1.0:1.

The reactive urethane group containing reaction product (A) is generally prepared as follows. Typically, the polyisocyanate is dissolved in an appropriate aromatic solvent such as xylene and toluene, together with a tin compound, such as dibutyl tin dilaurate, as a catalyst. The mixture is preheated to a temperature of approximately 55° C. at which time the monohydric capping agent is added dropwise. The addition rate is adjusted to maintain a reaction temperature of less than 90° C. The reaction is complete when all the isocyanate functionality is consumed.

As discussed above, crosslinking agent II of the present invention comprises the ungelled reaction product of the reactive urethane group containing reaction product (A) described above, and an aminotriazine compound (B) which has one or less non-alkylated NH bond per triazine ring.

Non-limiting examples of aminotriazine compounds suitable for use as component (B) in the preparation of the crosslinking agent II of the present invention include those discussed in detail above with reference to the crosslinking agent I.

In the preparation of crosslinking agent II of the present invention, the reactive urethane group-containing reaction product (A) and the aminotriazine compound (B) are combined in a molar ratio such that the aminotriazine compound (B) is in excess. This results in a stable crosslinking agent which is essentially free of urethane NH functionality. The reaction is monitored via infrared spectroscopy for the disappearance of urethane N—H functionality relative to an internal standard (i.e., the signal of a structure which will remain unchanged during the reaction, for example, the urethane carbonyl signal).

Typically, in the preparation of crosslinking agent II of the present invention, the molar ratio of the urethane group-containing reaction product (A) to the aminotriazine compound (B) ranges from 1:2.0 to 4.0, preferably from to 1:2.2 to 3.8, and more preferably from 1:2.4 to 3.5. With regard to the aminotriazine compound (B), it should be understood that the theoretical monomeric molecular weight of the aminotriazine compound was used to calculate the above referenced "molar ratio".

Crosslinking agent II of the present invention is prepared generally by reacting an alkoxylated amino-triazine compound, preferably a (methoxymethy) aminotriazine compound, with the urethane-containing material (A) in a suitable aromatic solvent such as xylene and toluene, together with an appropriate strong acid catalyst, for example dodecyl benzene sulfonic acid. Normal condensation techniques as are well-known to the art can be used. The reaction usually is carried out at a temperature ranging from 90° C. to 135° C., preferably 100° C. to 120° C., and terminated when the end point is detected by infrared spectroscopy.

Crosslinking agent II of the present invention typically has a glass transition temperature of at least 10° C., preferably at least 15° C., more preferably at least 20° C., and even more preferably at least 25° C. Also, the crosslinking agent II typically has a glass transition temperature less than 150° C., preferably less than 120° C., more preferably less than 100° C., and even more preferably less than 80° C. The glass transition temperature of the crosslinking agent II can range between any combination of these values, inclusive of the recited values.

The present invention also relates to a curable composition comprising (A) a polymer containing reactive functional groups and (B) a crosslinking agent having functional groups reactive with the functional groups of the polymer (A). The crosslinking agent (B) can comprise the crosslinking agents I and/or II described above.

In a preferred embodiment of the invention, the curable composition is a powder coating composition comprising a solid particulate film-forming mixture of (A) a polymer containing reactive functional groups and having a glass transition temperature of at least 30° C., and a crosslinking agent (B) chosen from crosslinking agent I and/or crosslinking agent II (both of which are described above) having functional groups reactive with the functional groups of the polymer (A).

Curable powder coatings are particulate compositions that are solid and free flowing at ambient room temperature. As mentioned above, the curable powder coating compositions of the present invention comprise, as a first component (A), at least one reactive functional group-containing polymer having a glass transition temperature of at least 30° C., e.g., a hydroxyl and/or an epoxide functional acrylic polymer, and as a second component (B), the crosslinking agent described above. The components (A) and (B) of the curable powder coating composition may each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions.

As used herein, the term "cure" as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK IIII DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C. min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density valves indicate a higher degree of crosslinking in the coating.

Also, as used herein, the term "polymer" is meant to refer to oligomers and both homopolymers and copolymers.

The polymer (A) can be any of a variety of polymers having aminoplast-reactive functional groups as are well known in the art, so long as the $T_g$ of the polymer is sufficiently high to permit the formation of a stable, solid particulate composition. The $T_g$ of the polymer (A) typically is at least 30° C., preferably at least 40° C., more preferably at least 50° C. The $T_g$ of the polymer (A) also typically is less than 130° C., preferably less than 100° C., more preferably less than 80° C. The $T_g$ of the functional group-containing polymer (A) can range between any combination of these values inclusive of the recited values.

Non-limiting examples of polymers having reactive functional groups useful in the powder coating compositions of the invention as the polymer (A) include those selected from acrylic, polyester, polyepoxide, polyurethane and polyether polymers. Acrylic and polyester polymersare preferred.

The polymer (A) can comprise a wide variety of reactive functional groups, for example hydroxyl, carboxyl, carbamate, epoxy and/or amide functional groups. The polymer (A) preferably comprises reactive functional groups selected the group consisting of hydroxyl, epoxy, carboxyl and/or carbamate functional groups. In one preferred embodiment, the polymer (A) comprises hydroxyl and/or carbamate functional groups. In another preferred embodiment of the present invention, the polymer (A) comprises hydroxyl and/or epoxy functional groups.

Suitable functional group-containing acrylic polymers include copolymers prepared from one or more alkyl esters of acrylic acid or methacrylic acid and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate and 2-ethylhexyl acrylate. Also, when epoxy functional polymers are desired, epoxy functional monomers, for example glycidyl acrylate and glycidyl methacrylate and allyl glycidyl ether, are suitable. Ethylenically unsaturated carboxylic acid functional monomers, for example acrylic acid and/or methacrylic acid, can also be used when a carboxylic acid functional acrylic polymer is desired. Amide functional acrylic polymers can be formed by polymerizing ethylenically unsaturated acrylamide monomers, such as N-butoxymethyl acrylamide and N-butoxyethyl acrylamide with other polymerizable ethylenically unsaturated monomers. Non-limiting examples of suitable other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride and vinyl esters, such as vinyl acetate.

In one embodiment of the present invention, the acrylic polymers contain hydroxyl functionality which can be incorporated into the acrylic polymer through the use of hydroxyl functional monomers such as hydroxyethyl acrylate, hydroxypropyl acrylate, hydroxyethyl methacrylate and hydroxypropyl methacrylate which may be copolymerized with the other acrylic monomers mentioned above.

In a preferred embodiment of the invention, the acrylic polymer can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include those which are commercially available from Shell Chemical Company under the tradename CARDURA® E; and from Exxon Chemical Company under the tradename GLYDEXX®-10.

Alternatively, the beta-hydroxy ester functional monomers are prepared from an ethylenically unsaturated, epoxy functional monomer, for example glycidyl methacrylate and allyl glycidyl ether, and a saturated carboxylic acid, such as a saturated monocarboxylic acid, for example, isostearic acid.

The hydroxyl group-containing acrylic polymers useful in the compositions of the present invention typically have a hydroxyl value ranging from 10 to 150, preferably from 15 to 100, and more preferably from 20 to 50.

The acrylic polymer is typically prepared by solution polymerization techniques in the presence of suitable initiators such as organic peroxides or azo compounds, for example, benzoyl peroxide or N,N-azobis(isobutylronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers can include the reaction product of hydroxyethyl methacrylate, isophorone diisocyanate and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

As preferred, carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic and aromatic alcohols, such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is preferred.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers are typically prepared by polymerizing one or more epoxide functional ethylenically unsaturated monomers, e.g., glycidyl (meth) acrylate and allyl glycidyl ether, with one or more ethylenically unsaturated monomers that are free of epoxide functionality, e.g., methyl (meth)acrylate, isobornyl (meth) acrylate, butyl (meth)acrylate and styrene. Examples of epoxide functional ethylenically unsaturated monomers that may be used in the preparation of epoxide functional acrylic polymers include, but are not limited to, glycidyl (meth) acrylate, 3,4-epoxycyclohexylmethyl (meth)acrylate, 2-(3, 4-epoxycyclohexyl)ethyl (meth)acrylate and allyl glycidyl ether. Examples of ethylenically unsaturated monomers that are free of epoxide functionality include those described above as well as those described in U.S. Pat. No. 5,407,707 at column 2, lines 17 through 56, which disclosure is incorporated herein by reference. In one embodiment of the present invention, the epoxide functional acrylic polymer is prepared from a majority of (meth)acrylate monomers.

The functional group-containing acrylic polymer typically has a Mn ranging from 500 to 30,000 and preferably from 1000 to 5000. If carbamate functional, the acrylic polymer typically has a calculated carbamate equivalent weight typically within the range of 15 to 150, and preferably less than 50, based on equivalents of reactive carbamate groups.

Non-limiting examples of functional group-containing polyester polymers suitable for use as the polymer (A) in the powder coating compositions of the present invention can include linear or branched polyesters having hydroxyl, carboxyl and/or carbamate functionality. Such polyester polymers are generally prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters using conventional techniques is also possible.

The polyols which usually are employed in making the polyester (or the polyurethane polymer, as described below) include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol, tris-hydroxyethylisocyanurate and the like. Branched polyols, such as trimethylolpropane, are preferred in the preparation of the polyester.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types The polyester may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate can be used. Because it is readily available and low in cost, terephthalic acid is preferred.

Pendent and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

The functional group-containing polyester polymer typically has a Mn ranging from 500 to 30,000, preferably about 1000 to 5000. If carbamate functional, the polyester polymer typically has a calculated carbamate equivalent weight within the range of 15 to 150, preferably 20 to 75, based on equivalents of reactive pendent or terminal carbamate groups.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

Non-limiting examples of suitable polyurethane polymers having pendent and/or terminal hydroxyl and/or carbamate functional groups include the polymeric reaction products of polyols, which are prepared by reacting the polyester polyols or acrylic polyols, such as those mentioned above, with a polyisocyanate such that the OH/NCO equivalent ratio is greater than 11 such that free hydroxyl groups are present in the product. Such reactions employ typical conditions for urethane formation, for example, temperatures of 60° C. to 90° C. and up to ambient pressure, as known to those skilled in the art.

The organic polyisocyanates which can be used to prepare the functional group-containing polyurethane polymer include aliphatic or aromatic polyisocyanates or a mixture of the two. Diiusocyanates are preferred, although higher polyisocyanates can be used in place of or in combination with diisocyanates.

Examples of suitable aromatic diisocyanates include 4,4'-diphenylmethane diisocyanate and toluene diisocyanate. Examples of suitable aliphatic diisocyanates include straight chain aliphatic diisocyanates, such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates include 1,2,4-benzene triisocyanate and polymethylene polyphenyl isocyanate.

Terminal and/or pendent carbamate functional groups can be incorporated into the polyurethane by reacting a polyisocyanate with a polyester polyol containing the terminal/pendent carbamate groups. Alternatively, carbamate functional groups can be incorporated into the polyurethane by reacting a polyisocyanate with a polyester polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer.

The hydroxyl and/or carbamate functional group-containing polyurethane polymers typically have a Mn ranging from 500 to 20,000, preferably from 1000 to 5000. If carbamate functional, the polyurethane polymer typically has a carbamate equivalent weight within the range of 15 to 150, preferably 20 to 75, based on equivalents of reactive pendent or terminal carbamate groups.

Although generally not preferred, for some applications it may be desirable to employ a functional group-containing polyether polymer in the powder coating compositions of the present invention. Suitable hydroxyl and/or carbamate functional polyether polymers can be prepared by reacting a polyether polyol with urea under reaction conditions well known to those skilled in the art. More preferably, the polyether polymer is prepared by a transcarbamoylation reaction similar to the reaction described above in connection with the incorporation of carbamate groups into the acrylic polymers.

Examples of polyether polyols are polyalkylene ether polyols which include those having the following structural formulae (III) and (IV):

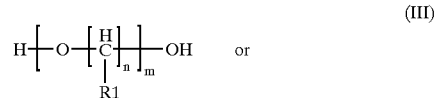

(III)

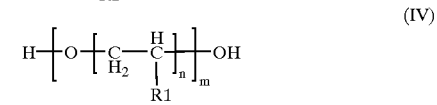

(IV)

where the substituent R1 is hydrogen or lower alkyl containing from 1 to 5 carbon atoms including mixed substituents, n is typically from 2 to 6, and m is from 8 to 100 or higher. Note that the hydroxyl groups, as shown in structures (II) and (III) above, are terminal to the molecules. Included are poly(oxytetramethylene) glycols, poly(oxytetraethylene) glycols, poly(oxy-1,2-propylene) glycols and poly(oxy-1,2-butylene) glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Preferred polyethers include those sold under the names TERATHANE® and TERACOL®, available from E.I. Du Pont de Nemours and Company, Inc. and POLYMEG®, available from QO Chemicals, Inc., a subsidiary of Great Lakes Chemical Corp.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Suitable functional group-containing polyether polymers preferably have a number average molecular weight (Mn) ranging from 500 to 30,000 and more preferably from 1000 to 5000. If carbamate functional, the polyether polymers have a carbamate equivalent weight of within the range of 15 to 150, preferably 25 to 75, based on equivalents of reactive pendent and/or terminal carbamate groups and the solids of the polyether polymer.

It should be understood that the preferred carbamate functional group-containing polymers typically contain residual hydroxyl functional groups which provide additional crosslinking sites. Preferably, the carbamate/hydroxyl functional group-containing polymer (A) has a residual hydroxyl value ranging from 0.5 to 10, more preferably from 1 to 10, and even more preferably from 2 to 10 (mg KOH per gram).

The functional group-containing polymer (A) typically is present in the powder coating compositions of the present invention in an amount ranging from at least 5 percent by weight, preferably at least 20 percent by weight, more preferably at least 30 percent by weight, and even more preferably at least 40 percent by weight based on the total weight of resin solids in the film-forming composition. The functional group-containing polymer (A) also typically is present in the powder coating compositions of the present invention in an amount less than 90 percent by weight, preferably less than 80 percent by weight, more preferably less than 70 percent by weight, and even more preferably less than 60 percent by weight based on the total weight of the powder coating composition. The amount of the functional group-containing polymer (A) present in the powder coating compositions of the present invention can range between any combination of these values inclusive of the recited values.

As mentioned above, the powder coating compositions of the present invention further comprise, as component (B), the crosslinking agents I and II described in detail above. The crosslinking agent (B) typically is present in the powder coating compositions of the present invention in an amount ranging from at least 5 percent by weight, preferably at least 10 percent by weight, more preferably at least 20 percent by weight, and even more preferably at least 30 percent by weight based on the total weight of the powder coating composition. The crosslinking agent (B) also typically is present in the powder coating compositions of the present invention in an amount less than 90 percent by weight, preferably less than 80 percent by weight, more preferably less than 70 percent by weight, and even more preferably less than 60 percent by weight based on the total weight of the powder coating composition. The amount of the crosslinking agent (B) present in the powder coating compositions of the present invention can range between any combination of these values inclusive of the recited values.

If desired, the powder coating compositions of the present invention can also include one or more adjuvant curing agents different from the crosslinking agent (B). The adjuvant curing agent can be any compound having functional groups reactive with the functional groups of the polymer (A) described above. Non-limiting examples of suitable adjuvant curing agents include blocked isocyanates, triazine compounds, glycoluril resins, and mixtures thereof.

The blocked isocyanates suitable for use as the adjuvant curing agent in the powder coating compositions of the invention are known compounds and can be obtained from commercial sources or may be prepared according to published procedures. Upon being heated to cure the powder coating compositions, the isocyanates are unblocked and the isocyanate groups become available to react with the functional groups of the polymer (A).

Any suitable aliphatic, cycloaliphatic or aromatic alkyl monoalcohol known to those skilled in the art can be used as a blocking agent for the isocyanate. Other suitable blocking agents include oximes and lactams. Non-limiting examples of suitable blocked isocyanate curing agents include those based on isophorone diisocyanate blocked with ε-caprolactam; toluene 2,4-toluene diisocyanate blocked with ε-caprolactam; or phenol-blocked hexamethylene diisocyanate. The blocked isocyanates mentioned immediately above are described in detail in U.S. Pat. No. 4,988,793 at column 3, lines 1 to 36. Preferred blocked isocyanate curing agents include BF-1530, which is the reaction product of epsilon-caprolactam blocked T1890, a trimerized isophorone diisocyanate ("IPDI") with an isocyanate equivalent weight of 280, and BF-1540, a uretidione of IPDI with an isocyanate equivalent weight of 280, all of which are available from Creanova of Somerset N.J.

Conventional aminoplast crosslinkers can be used as the adjuvant curing agent provided that the Tg of the coating is not lowered to an undesirable extent. A particularly preferred class of aminoplast resins include aldehyde condensates of glycoluril, such as those described above. Glycoluril resins suitable for use as the adjuvant curing agent in the powder coating compositions of the invention include POWDERLINK® 1174 commercially available from Cytec Industries, Inc. of Stamford, Conn.

When employed, the adjuvant curing agent typically is present in the powder coating compositions of the present invention in an amount ranging from 5 to 0.5 percent by weight, preferably from 5 to 1 percent by weight, more preferably from 5 to 2 percent by weight, and even more preferably from 4 to 2 percent by weight based on the total weight of the powder coating composition.

Also suitable for use as an adjuvant curing agent in the powder coating compositions of the present invention are triazine compounds, such as the tricarbamoyl triazine compounds described in detail in U.S. Pat. No. 5,084,541. When used, the triazine curing agent is typically present in the powder coating composition of the present invention in an amount ranging up to about 20 percent by weight, and preferably from about 1 to 20 percent by weight, percent by weight based on the total weight of the powder coating composition. Mixtures of the above-described curing agents also can be used advantageously.

Also, it should be understood that for purposes of the present invention, the curable powder coating compositions which contain epoxy group-containing polymers typically also include an epoxide-reactive curing (i.e., crosslinking) agent, preferably an acid functional curing agent, in addition to the crosslinking agent I and/or II. A secondary hydroxyl group can be generated upon reaction of each epoxy functional group with a functional group of the epoxide-reactive curing agent. These secondary hydroxyl groups are then available for subsequent reaction with the aminotriazine-based crosslinking agents I and/or II.

Epoxide-reactive curing agents which can be used in curable powder coating compositions comprising an epoxide functional polymer may have functional groups selected from hydroxyl, thiol, primary amines, secondary amines, acid (e.g. carboxylic acid) and mixtures thereof. Useful epoxide reactive curing agents having amine functionality include, for example, dicyandiamide and substituted dicyandiamides. Preferably, the epoxide reactive curing agent has carboxylic acid groups.

In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, it is preferred that the epoxide reactive crosslinking agent have a melt viscosity less than that of the epoxy functional polymer (at the same temperature). As used herein and in the claims, by "epoxide reactive crosslinking agent" is meant that the epoxide reactive crosslinking agent has at least two functional groups that are reactive with epoxide functionality.

Preferably, the epoxide reactive crosslinking agent is a carboxylic acid functional curing agent, which contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid and mixtures thereof.

Other suitable carboxylic acid functional curing agents include those represented by the following general formula (V),

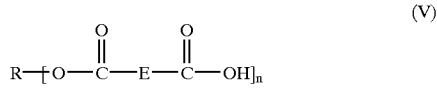

In general formula (V), R is the residue of a polyol, E is a divalent linking group having from 1 to 10 carbon atoms, and n is an integer of from 2 to 10. Examples of polyols from which R of general formula (V) may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group E is preferably aliphatic.

The curing agent represented by general formula (V) is typically prepared from a polyol and a dibasic acid or cyclic anhydride. For example, trimethylol propane and hexahydro-4-methylphthalic anhydride are reacted together in a molar ratio of 1:3 respectively, to form a carboxylic acid functional curing agent. This particular curing agent can be described with reference to general formula (V) as follows, R is the residue of trimethylol propane, E is the divalent linking group 4-methyl-1,2-cyclohexylene, and n is 3. Carboxylic acid functional curing agents described herein with reference to general formula V also are meant to include any unreacted starting materials and/or co-products, e.g., oligomeric species, resulting from their preparation and contained therein.

Curable powder coating compositions comprising an epoxide functional polymer and an epoxide reactive curing agent can also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. When employed, the curing catalyst is typically present in the curable powder coating composition in an amount of less than 5 percent by weight, e.g., from 0.25 percent by weight to 2.0 percent by weight, based on total weight of the composition.

Curable powder coating compositions comprising epoxide functional polymers and epoxide reactive curing agents typically have present therein epoxide functional polymer in an amount ranging from 2 percent to 50 percent by weight, based on total weight of the composition, e.g., from 70 percent to 85 percent by weight, based on total weight of the composition. The epoxide reactive curing agent is typically present in the curable powder coating composition in an amount corresponding to the balance of these recited ranges, i.e., 5 to 40, particularly 15 to 30, percent by weight. The equivalent ratio of epoxide equivalents in the epoxide functional polymer to the equivalents of reactive functional groups in the curing agent is typically from 0.5:1 to 2:1, e.g., from 0.8:1 to 1.5:1.

Curable powder coating compositions of the present invention comprising an epoxide functional polymer as reactant (A) and an epoxide reactive curing agent typically contain the crosslinking agent (B) in an amount ranging from 2 to 50 weight percent, preferably from 3 to 40 weight percent and more preferably from 5 to 20 weight percent based on total weight of the powder coating composition.

The powder coating compositions of the present invention can further include additives as are commonly known in the art. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, fillers such as calcium carbonate, barium sulfate and the like; pigments and dyes as colorants; UV light stabilizers such as TINUVIN® 123 or TINUVIN® 900 available from Cytec Industries, Inc. and catalysts to promote the various crosslinking reactions.

Such additives are typically present in the powder coating compositions of the present invention in an amount ranging from 5 to 50 weight percent based on total weight of the powder coating composition.

The powder coating compositions of the invention are typically prepared by blending the functional group-containing polymer (A) and the crosslinking agent (B) for approximately 1 minute in a Henschel blade blender. The powder is then extruded through an extruder, for example a Baker-Perkins twin screw extruder, at a temperature ranging from 70° F. to 130° F. (21.1° C. to 54.4° C.). The finished powder then can be classified to an appropriate particle size, typically between 20 and 200 microns, in a cyclone grinder/sifter.

The powder coating compositions of the invention can be applied to a variety of substrates including metallic substrates, for example, aluminum and steel substrates, and non-metallic substrates, for example, thermoplastic or thermoset composite substrates. The powder coating compositions are typically applied by spraying, and in the case of a metal substrate, by electrostatic spraying which is preferred, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the powder coating composition, the powder coated substrate is heated to a temperature sufficient to cure the coating, typically to a temperature ranging from 250° F. to 500° F. (121.1° C. to 260.0° C.) for 1 to 60 minutes, and preferably from 300° F. to 400° F. (148.9° C. to 204.4° C.) for 15 to 30 minutes.

The powder coating composition can be applied as a primer or primer surfacer, or as a topcoat, for example, a "monocoat". In one embodiment, the present invention is directed to a powder coating composition which is advantageously employed as a topcoat in a multi-layer composite coating composition. Such a multi-component composite coating composition generally comprises a basecoat deposited from a basecoat film-forming composition (which preferably is pigmented) and a topcoat applied over the basecoat, the topcoat being deposited from the powder coating composition of the present invention as described above. In a preferred embodiment, the multi-component composite coating composition is a color-plus-clear system where the topcoat is deposited from a powder coating composition which is substantially pigment-free, i.e., a clear coat.

The film-forming composition from which the basecoat is deposited can be any of the compositions useful in coatings applications, for example, in automotive applications where color-plus-clear systems are most often used. A film-forming composition conventionally comprises a resinous binder and, typically, a pigment to serve as a colorant. Particularly useful resinous binders include acrylic polymers, polyesters including alkyds, and polyurethanes.

The resinous binders for the basecoat can be organic solvent-based materials, such as those described in U.S. Pat. No. 4,220,679. Water-based coating compositions, such as those described in U.S. Pat. Nos. 4,403,003; 4,147,679; and 5,071,904, also can be used as the basecoat composition.

As mentioned above, the basecoat compositions also contain pigments of various types as colorants. Suitable metallic pigments include aluminum flake, bronze flake, copper flake and the like. Other examples of suitable pigments include mica, iron oxides, lead oxides, carbon black, titanium dioxide, talc, as well as a variety of color pigments.

Optional ingredients for the basecoat film-forming compositions include those which are well known in the art of surface coatings and include surfactants, flow control agents, thixotropic agents, fillers, anti-gassing agents, organic co-solvents, catalysts and other suitable adjuvants.

The basecoat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The basecoat film-forming compositions are typically applied to the substrate such that a cured basecoat having a film thickness ranging from 0.5 to 4 mils (12.5 to 100 micrometers) is formed thereon.

After forming a film of the basecoat on the substrate, the basecoat can be cured or alternatively given a drying step in which solvent, i.e., organic solvent and/or water, is driven off by heating or an air drying step before application of the clear coat. Suitable drying conditions will depend on the particular basecoat film-forming composition and on the ambient humidity with certain water-based compositions. In general, a drying time ranging from 1 to 15 minutes at a temperature of 75° F. to 200° F. (21° C. to 93° C.) is adequate.

The curable powder topcoating composition can be applied to the basecoat by any of the methods of application described above. As discussed above, the powder topcoat can be applied to a cured or a dried basecoat before the basecoat has been cured. In the latter case, the powder topcoat and the basecoat are cured simultaneously.

Illustrating the invention are the following examples which are not to be considered as limiting the invention to their details. Unless otherwise indicated, all parts and percentages in the following examples, as well as throughout the specification, are by weight.

EXAMPLES

Examples A through C describe the preparation of powder crosslinking agents of the present invention. Example A describes the preparation of crosslinking agent I and Examples B and C describe the preparation of crosslinking agents II.

Examples 1 through 6 describe the preparation of curable powder coating compositions. Examples 1 through 3 describe the preparation of powder coating compositions based on a hydroxyl functional acrylic resin. Example 1 contains crosslinking agent I of Example A, Example 2 contains crosslinking agent II of Example C and Comparative Example 3 contains a conventional glycoluril crosslinking agent. Examples 4 through 6 describe the preparation of powder coating compositions based on a carbamate functional acrylic resin. Example 4 contains crosslinking agent I of Example A, Example 5 contains crosslinking II of Example C and Comparative Example 6 contains a conventional glycoluril crosslinking agent.

Powder Crosslinking Agents

Example A

This example describes the preparation of a crosslinking agent of the present invention (crosslinking agent I) obtained by pre-reacting a polyester polyol and phenyl isocyanate, and subsequently reacting the reaction product with an aminotriazine compound, CYMEL® 300. The crosslinking agent I was prepared as follows:

Example A-1

Preparation of the Polyester

The following ingredients were added to a two-liter, four-necked reaction vessel equipped with a thermometer, stirrer, nitrogen inlet, and a separator: 955.0 parts by weight of hydrogenated Bisphenol-A; 308.0 parts by weight of hexahydrophthalic anhydride; 1.3 parts by weight of dibutyl tin oxide, and 1.3 parts by weight of triisodecylphosphite. The mixture was melted by heating and then further heated to a temperature of 230° C. as water resulting from the condensation reaction was removed through the separator. The reaction was terminated when an acid value of 2 was achieved. The polyester polyol thus formed had a hydroxyl number of 160 and Tg of 65° C.

Example A-2

Preparation of the Crosslinking Agent I

The following ingredients were added to a two-liter, four-necked reaction vessel equipped with a thermometer, stirrer, nitrogen inlet, and means for removing the reaction by-product (methanol): 284.6 parts by weight of the polyester of Example A-1 above; and 340.0 parts by weight of xylene. The reaction mixture was heated to a temperature of 110° C. and held at that temperature for a period of 2 hours under constant nitrogen sparge. The reaction mixture was then cooled to a temperature of 60° C. at which time a mixture of 95.3 parts by weight of phenyl isocyanate and 0.8 part by weight of di-butyl tin di-laurate was added dropwise through an addition funnel. Subsequently 100.0 parts by weight of xylene was added and the reaction mixture was held at a temperature of 90° C. until the mixture was free of NCO functionality. Thereafter, 640.0 parts by weight of CYMEL® 300 and 2.0 parts by weight of p-toluenesulfonic acid was added to the reaction vessel. The reaction mixture was then heated to a temperature of 120° C. and the temperature was maintained as the methanol by-product was removed from the system. The reaction was monitored by infrared spectroscopy for the disappearance of the urethane N—H signal (3200–3600 cm$^{-1}$) relative to that of the the urethane carbonyl. The reaction was terminated when this end point was detected. The reaction mixture was subsequently cooled to temperature of 100° C. at which time 5.52 parts by weight of sodium carbonate were added. The mixture further stirred at a temperature of 100° C. for one hour before filtering through a 5 micron filtration bag. The reaction product was then concentrated in vacuo at a temperature of 1000 to 130° C. and a pressure of 3 to 50 mm Hg to remove the xylene solvent. The reaction product thus obtained was a pale yellow solid with a softening temperature of about 35° C.

Example B

This example describes the preparation of a crosslinking agent II of the present invention obtained by reaction of a methanol-capped isophorone diisocyanate trimer with an aminotriazine compound, CYMEL® 300. The crosslinking agent II was prepared as follows:

The following ingredients were added to a two-liter, four-necked reaction vessel equipped with a thermometer, stirrer, nitrogen inlet, and means for removing the reaction by-product (methanol): 355.2 parts by weight of isophorone diisocyanate trimer; 300.5 parts by weight of xylene; and 0.5 part by weight of di-butyl tin di-laurate. The admixture was heated to a temperature of 60° C. at which time 64.0 parts by weight of methanol were added dropwise through an addition funnel. The reaction mixture was then further heated to and held at a temperature of 90° C. until free of NCO functionality. Thereafter, 1280.0 parts of CYMEL® 300 and 3.0 parts of p-toluenesulfonic acid were added to the reaction vessel. The mixture was heated to a temperature of 120° C. and maintained at that temperature as the methanol by-product was removed from the system. The reaction was monitored by infrared spectroscopy for the disappearance of urethane N—H signal (3200–3600 cm$^{-1}$) and terminated when this end point was detected. The reaction product was then concentrated in vacuo at a temperature ranging from 1000 to 130° C. and a pressure of 3 to 50 mm Hg to remove the xylene solvent. The reaction product thus obtained was a pale yellow solid having a softening temperature of about 25° C.

Example C

This example describes the preparation of a crosslinking agent II of the present invention obtained by reaction of cyclohexanol-capped isophorone diisocyanate trimer with the aminotriazine compound, CYMEL® 300. The crosslinking agent II was prepared as followed:

The following ingredients were added to a two-liter, four-necked reaction vessel equipped with a thermometer, stirrer, nitrogen inlet, and means for removing the reaction by-product (methanol): 222.0 parts by weight of isophorone diisocyanate trimer; 200.5 parts by weight of xylene; and 0.8 part by weight of di-butyl tin di-laurate. After the admixture was heated to a temperature of 60° C., 110.0 parts by weight of cyclohexanol and 218.0 parts by weight of xylene were added dropwise through an addition funnel. The reaction mixture was further heated to and held at a temperature of 90° C. until free of NCO functionality. Thereafter, 800.0 parts by weight of CYMEL® 300 and 2.0 parts of p-toluenesulfonic acid were added to the vessel. The mixture was then heated to a temperature of 120° C. and the temperature was maintained as the methanol by-product was removed from the system. The reaction was monitored by infrared spectroscopy for disappearance of urethane N—H signal (3200–3600 cm$^{-1}$) and terminated when that end point was detected. The reaction product was then concentrated in vacuo at a temperature of 1000 to 130° C. and pressure of 3 to 50 mm Hg to remove the xylene solvent. The reaction product thus obtained was a pale yellow solid having a softening temperature of about 25° C.

Examples 1 through 6

Curable Powder Coating Compositions

Powder coating compositions were prepared from a mixture of the following ingredients:

Each of the above-described powder coating compositions was prepared as follows. For each of the powder coating compositions of Examples 1 through 6, all of the listed components were blended for 10 seconds at 3500 rpm in a PRISM blender. The powders were then fed through a 19 millimeter, twin screw extruder available from b&p Process Equipment and Systems, by way of an ACCU-RATE auger feeder. The resulting chip was classified to a median particle size of approximately 40 microns.

Each of the powder coating compositions thus prepared were applied by electrostatic spray using a Nordson Versa-Spray II, corona-type spray gun to B1000 P60 DIW steel test panels (available from ACT Laboratories, Inc.) to a targeted cured film thickness of 2.0 to 3.0 mils (50 to 75 micrometers). Two panel sets were prepared wherein the coating compositions were cured at two different cure temperatures. The first panel set was cured at 320° F. (160° C.) for 20 minutes, and the second set was cured at 380° F. (193.3° C.) for 20 minutes.

Testing Procedures

The powder storage stability of each powder coating composition was evaluated by storing a 20 g sample of each powder coating composition at a temperature of 40° C. for a 24 hour period. The stability of the powder was determined upon visual inspection. Powder stability results are reported from best to worst as follows: excellent, good, slightly cakey, cakey, slightly clumpy, clumpy, fused and sintered.

The propensity of the coating composition to "gas" upon curing was tested by increasing the cured film thickness of the powder coating on a test panel until surface defects (i.e., pinholes) formed due to the escape of gases through the coating surface during the cure process. Values reported represent the maximum film thickness achieved just prior to the development of the pinholes in the coating surface.

Chemical resistance and extent of cure was evaluated by double rubs using methyl ethyl ketone. Results reported represent the extent of film surface marring or softening in the area contacted with the methyl ethyl ketone after 100 double rubs.

Mar resistance was evaluated as follows. The initial 20° gloss the cured powder coating of the present invention was measured using a 20° NOVO-GLOSS 20 statistical glossmeter, available from Gardner Instrument Company, Inc. Each coated substrate was then subjected to scratch testing by linearly scratching the cured coating surface to which an abrasive, such as BON AMI® had been applied, for ten double rubs using an Atlas AATCC Scratch Tester, Model CM-5, available from Atlas Electrical Devices Company of Chicago, Ill. The test panels were then rinsed with tap water and carefully patted dry with a paper towel. The 20° gloss was measured on the scratched area of each test panel. The number reported is the percent of the initial gloss retained after scratch testing, i.e., 100%×scratched gloss/initial gloss.

The degree of gloss and the degree of haziness (or lack of film clarity) of the cured powder coating was measured using BYK HAZE/GLOSS instrument from BYK Chemical. Higher numbers indicate a higher degree of gloss and haziness.

Test results for each powder coating composition cured at 320° F. (160° C.) for 20 minutes are reported in the following Table 1.

TABLE 1

| Test Performed | Example 1 (grams) | Example 2 (grams) | Example 3 Comparative (grams) | Example 4 (grams) | Example 5 (grams) | Example 6 Comparative (grams) |
| --- | --- | --- | --- | --- | --- | --- |
| MEK rubs | Very slight mar | Very slight mar | Fail, <10 rubs | Very slight mar | Slight mar | Fail, <10 rubs |
| Gassing | 4.3 mils (105 micrometers) | 4.9 mils (122.5 micrometers) | 2.5 mills (62.5 micrometers) | 3.9 mils (97.5 micrometers) | 5.1 mils (127.5 micrometers) | 2.2 mils (55 micrometers) |
| Powder stability | Slightly clumpy | Slightly clumpy | Sintered | Excellent | Excellent | Clumpy |
| Mar resistance | 91% initial gloss retained | 95% initial gloss retained | 76% initial gloss retained | 75% initial gloss retained | 89% initial gloss retained | 48% initial gloss retained |
| Gloss/Haze | 78/140 | 84/52 | 77/160 | 62/400 | 76/195 | 68/283 |

Test results for each powder coating composition cured at 380° F. (193.3° C.) for are reported in the following Table 2.

TABLE 2

| Test Performed | Example 1 (grams) | Example 2 (grams) | Example 3 Comparative (grams) | Example 4 (grams) | Example 5 (grams) | Example 6 Comparative (grams) |
| --- | --- | --- | --- | --- | --- | --- |
| MEK rubs | No mar | No mar | Mar, softened | No mar | No mar | Mar, softened |
| Gassing | 4.3 mils (105 micrometers) | 4.9 mils (122.5 micrometers) | 2.5 mills (62.5 micrometers) | 3.9 mils (97.5 micrometers) | 5.1 mils (127.5 micrometers) | 2.2 mils (55 micrometers) |
| Powder stability | Slightly clumpy | Slightly clumpy | Sintered | Excellent | Excellent | Clumpy |
| Mar resistance | 81% initial gloss retained | 98% initial gloss retained | 51% initial gloss retained | 50% initial gloss retained | 70% initial gloss retained | 11% initial gloss retained |
| Gloss/Haze | 74/213 | 84/45 | 74/223 | 64/356 | 77/203 | 49/445 |

The data presented in Tables 1 and 2 above illustrate that curable powder coating compositions which contain the crosslinking agents of the present invention provide cured coatings having improved cure and chemical resistance, less of a tendency to gas upon cure, superior mar resistance and less haze when compared to analogous compositions which contain a conventional glycoluril crosslinking agent. Moreover, the powder coating compositions of the present invention provide improved powder storage stability over the comparative compositions.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A crosslinking agent comprising the ungelled reaction product of the following:
    (A) a reactive urethane group-containing reaction product of the following reactants:
        (1) a polyisocyanate, and
        (2) a monohydric capping agent, and
    (B) an aminotriazine compound having one or less non-alkylated NH bond per triazine ring,
        wherein said crosslinking agent is essentially free of urethane N—H functionality and has a glass transition temperature of at least 10° C.

2. The crosslinking agent of claim 1, wherein the polyisocyanate (1) is selected from the group consisting of isocyanurate isophorone diisocyanate trimer, isocyanurate of hexane diisocyanate trimer and mixtures thereof.

3. The crosslinking agent of claim 2, wherein the polyisocyanate (1) comprises the isocyanurate of isophorone diisocyanate trimer.

4. The crosslinking agent of claim 1, wherein the monohydric capping agent (2) is selected from the group consisting of methanol, cyclohexanol, phenol and mixtures thereof.

5. The crosslinking agent of claim 1, wherein the monohydric capping agent (2) comprises cyclohexanol.

6. The crosslinking agent of claim 1, wherein the ratio of NCO equivalents of the polyisocyanate (1) to OH equivalents of the monohydric capping agent (2) ranges from 0.8 to 1.0:1.

7. The crosslinking agent of claim 1, wherein the aminotriazine compound (B) has a degree of polymerization of 1.5 or less.

8. The crosslinking agent of claim 1, wherein the aminotriazine compound (B) comprises an (alkoxyalkyl)aminotriazine.

9. The crosslinking agent of claim 8, wherein the aminotriazine compound comprises (methoxymethyl)aminotriazine.

10. The crosslinking agent of claim 1, wherein the molar ratio of the urethane group-containing reaction product (A) to the aminotriazine compound (B) ranges from 1:2.0 to 4.0.

11. A method for preparing a powder crosslinking agent comprising the following steps:
(1) reacting the following reactants:
   (a) a polyisocyanate, and
   (b) a monohydric capping agent,
      wherein the ratio of NCO equivalents of reactant (1) to OH equivalents of reactant (2) ranges from 0.8 to 1.0:1, to form a urethane group-containing reaction product;
(2) combining the reaction product of step (1) with an aminotriazine compound having one or less non-alkylated NH bond per triazine ring in a molar ratio of urethane group-containing reaction product to aminotriazine compound ranging from 1.0:2.0 to 4.0 to form a reaction admixture; and
(3) heating the reaction admixture of step (2) to a temperature ranging from 95° C. to 135° C. for a time sufficient to form a powder crosslinking agent having a glass transition temperature of at least 10° C. which is essentially free of urethane NH functionality as determined by infrared spectroscopy.

12. The method of claim 11, wherein the polyisocyanate (a) is selected from the group consisting of isocyanurate of isophorone diisocyanate trimer, isocyanurate of hexane diisocyanate trimer and mixtures thereof.

13. The method of claim 12, wherein the polyisocyanate (a) comprises the isocyanurate of isophorone diisocyanate trimer.

14. The method of claim 11, wherein the monohydric capping agent (b) is selected from the group consisting of methanol, cyclohexanol, phenol and mixtures thereof.

15. The method of claim 14, wherein the monohydric capping agent (b) comprises cyclohexanol.

16. The method of claim 11, wherein the aminotriazine compound has a degree of polymerization of 1.5 or less.

17. The method of claim 11, wherein the aminotriazine compound comprises an (alkoxyalkyl)aminotriazine.

18. The method of claim 17, wherein the aminotriazine compound comprises (methoxymethyl)aminotriazine.

19. A curable composition comprising the following components:
(A) a film-forming polymer having reactive functional groups; and
(B) a crosslinking agent having functional groups reactive with the functional groups of (A),
   said crosslinking agent comprising the ungelled reaction product of the following:
      (1) a reactive urethane group-containing reaction product of the following reactants:
         (a) a polyisocyanate, and
         (b) a monohydric capping agent; and
      (2) an aminotriazine compound having one or less non-alkylated NH bond per triazine ring, wherein said crosslinking agent is essentially free of urethane N—H functionality.

20. The curable composition of claim 19, wherein the polymer (A) is selected from the group consisting of acrylic, polyester, polyepoxide polyurethane and polyether polymers, and mixtures thereof.

21. The curable composition of claim 19, wherein the polymer (A) comprises reactive functional groups selected from the group consisting of hydroxyl, carbamate, epoxy, carboxylic acid, and mixtures thereof.

22. The curable composition of claim 21, wherein the polymer (A) comprises hydroxyl and/or carbamate functional groups.

23. The curable composition of claim 21, wherein the polymer (A) comprises hydroxyl and/or epoxy functional groups.

24. The curable composition of claim 19, wherein the polymer (A) is present in an amount ranging from 90 to 5 weight percent based on weight of total resin solids present in the composition.

25. The curable composition of claim 19, wherein the polyisocyanate (a) is selected from the group consisting of isocyanurate of isophorone diisocyanate trimer, isocyanurate of hexane diisocyanate trimer and mixtures thereof.

26. The curable composition of claim 25, wherein the polyisocyanate (a) comprises an isocyanurate of isophorone diisocyanate trimer.

27. The curable composition of claim 19, wherein the monohydric capping agent (b) is selected from the group consisting of methanol, cyclohexanol, phenol and mixtures thereof.

28. The curable composition of claim 27, wherein the monohydric capping agent (b) comprises cyclohexanol.

29. The curable composition of claim 19, wherein the ratio of NCO equivalents of the polyisocyanate (a) to OH equivalents of the monohydric capping agent (b) ranges from 0.8 to 1.0:1.

30. The curable composition of claim 19, wherein the aminotriazine compound (2) has a degree of polymerization of 1.5 or less.

31. The curable composition of claim 30, wherein the aminotriazine compound (2) comprises (alkoxyalkyl)aminotriazine.

32. The curable composition of claim 31, wherein the aminotriazine compound comprises (methoxymethyl)aminotriazine.

33. The curable composition of claim 19, wherein the molar ratio of the urethane group-containing reaction product (1) to the aminotriazine compound (2) ranges from 1:2.0 to 4.0.

34. The curable composition of claim 19, wherein the crosslinking agent (B) is present in an amount ranging from 5 to 90 weight percent based on weight of total resin solids present in the composition.

35. A curable powder coating composition comprising a solid particulate mixture of the following components:
(A) a polymer having reactive functional groups, said polymer having a glass transition temperature of at least 30° C.; and
(B) a crosslinking agent having functional groups reactive with the functional groups of (A),
   said crosslinking agent comprising the ungelled reaction product of the following:
      (1) a reactive urethane group-containing reaction product of the following reactants:
         (a) a polyisocyanate, and
         (b) a monohydric capping agent, and
      (2) an aminotriazine compound having one or less non-alkylated NH bond per triazine ring, wherein said crosslinking agent is essentially free of urethane N—H functionality and has a glass transition temperature of at least 10° C.

36. The curable powder coating composition of claim 35, wherein the polymer (A) is selected from the group consisting of acrylic, polyester, polyepoxide, polyurethane and polyether polymers and mixtures thereof.

37. The curable powder coating composition of claim 35, wherein the polymer (A) comprises hydroxyl and/or carbamate functional groups.

38. The curable powder coating composition of claim 35, where in the polymer (A) is present in an amount ranging from 90 to 5 weight percent based on total weight of the composition.

39. The curable powder coating composition of claim 35, wherein the molar ratio of the urethane group-containing reaction product (1) to the aminotriazine compound (2) ranges from 1:2.0 to 4.0.

40. The curable powder coating composition of claim 35, wherein the crosslinking agent (B) is present in an amount ranging from 5 to 90 weight percent based on total weight of the composition.

* * * * *